United States Patent [19]

Granger et al.

[11] 4,027,447

[45] June 7, 1977

[54] SOLAR PANEL

[76] Inventors: Floyd Randolph Granger, 24 Heard Drive; Michael Gerard Granger, 10 Delores St., both of Greenville, S.C. 29605

[22] Filed: July 1, 1976

[21] Appl. No.: 701,899

[52] U.S. Cl. .................................. 52/618; 52/625
[51] Int. Cl.² .......................................... E04B 2/28
[58] Field of Search ............. 52/618, 199, 200, 18, 52/625, 616; 428/184, 185

[56] References Cited

UNITED STATES PATENTS

| | | | |
|---|---|---|---|
| 2,316,993 | 4/1943 | Sherwood | 52/616 X |
| 3,358,408 | 12/1967 | Cooper, Jr. et al. | 52/202 |
| 3,385,018 | 5/1968 | Harry | 52/625 X |
| 3,950,910 | 4/1976 | Pobanz | 52/618 |

*Primary Examiner*—Price C. Faw, Jr.
*Assistant Examiner*—Carl D. Friedman
*Attorney, Agent, or Firm*—Bailey, Dority & Flint

[57] ABSTRACT

A panel structure mounted on the roof of a building for permitting solar energy to pass therethrough into the building. The panel structure includes a first translucent panel having corrugations running in a first direction. A second translucent panel is placed on top of the first translucent panel with the corrugations running perpendicular thereto. The two panels are secured together and sealing members are interposed between the first and second panels. Upper surfaces of the sealing members are complementary in shape with the corrugations for mating with the upper panel and producing a seal between the panels along two edges thereof. A second sealing strip seals the other two edges of the panels. Thus, a structurally strong and lightweight panel is produced that can be readily mounted on a roof.

3 Claims, 3 Drawing Figures

SOLAR PANEL

BACKGROUND OF THE INVENTION

The present invention relates to a panel structure and more particularly to a panel structure which permits solar energy to pass therethrough for heating a collector or the like carried therebelow.

It is well known to mount panels on the roofs of buildings for permitting thermal energy from the sun to pass therethrough for heating collector panels. One such structure is disclosed in our co-opending U.S. Patent Application, Ser. No. 673,664, filed on Apr. 5, 1976. In that particular application the panel is mounted on the roof so that solar energy heats the air carried within the attic producing a source of thermal energy. Hot air is forced through rocks for storing the thermal energy and is passed through the house for maintaining the desired temperature in the house.

SUMMARY OF THE INVENTION

The invention includes a panel structure of being mounted on the roof of a building while permitting solar energy to pass therethrough to heat a collector carried therebelow. The panel structure includes first and second corrugated members which are positioned transverse to each other. Sealing members are interposed between the panels and have upper surfaces complementary in shape to the corrugated panel for producing a seal between the two panels along two edges thereof. Second sealing members are carried on the sides of the panels for sealing these edges. Depending on the desired use of the panel, air may be evacuated from between the two panels to produce a vacuum therebetween if desired.

Accordingly, it is an important object of the present invention to provide a panel structure for permitting solar energy to pass therethrough to a collector.

Another important object of the invention is to provide a panel structure which can be readily mounted on the roof of a building through which solar energy can pass therethrough while minimizing heat losses.

Still another object of the present invention is to provide a panel which may be constructed on site or may be fabricated beforehand for installation on the roof of a building so as to permit solar energy to pass therethrough.

These and other objects and advantages of the invention will become apparent upon reference to the following specification, attendant claims and drawing.

DESCRIPTION OF A PREFERRED EMBODIMENT

Figure 1:
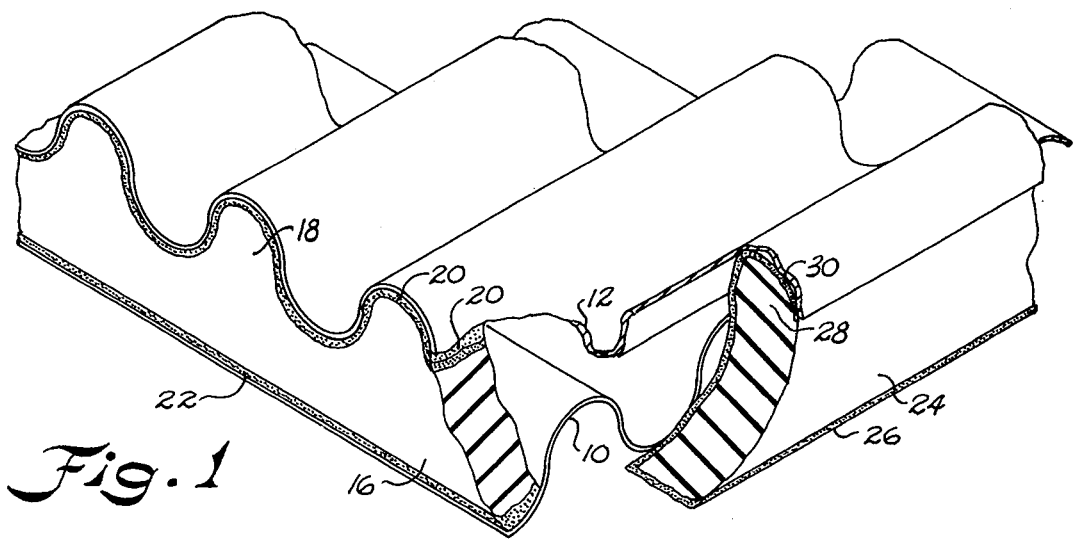
FIG. 1 is an enlarged fragmentary perspective view with parts broken away for purposes of clarity illustrating a panel constructed in accordance with the present invention.

Referring in more detail to FIG. 1 of the drawing, there is illustrated a panel structure which includes a pair of spaced translucent panels 10 and 12 which may be constructed of any suitable material such as polyester resin and fiberglass so as to permit thermal energy to pass therethrough. The top panel 12 is positioned directly on top of the bottom panel 10 with the corrugations therein running perpendicular thereto. As can be seen, the corrugations of the lower panel 10 illustrated in FIG. 2, run perpendicular to the truss 14 of a building. The corrugations of the upper panel 12, in turn, run parallel to the direction of the truss 14 and perpendicular to the corrugations of the lower panel 10. A sealing member 16 is interposed between the lower panel 10 and the upper panel 12 for providing a seal therebetween. The sealing member 16 may be constructed of any suitable material such as wood, and has an upper surface which includes corrugations 18 that are complementary to the corrugations in the upper panel 12 so that the upper panel 12 nests thereon. Interposed between the corrugated members 18 of the sealing member 16 and the panel 12 is a sealing strip 20 that has adhesive on both sides so as to secure the sealing member 16 to the upper panel. A similar sealing strip 22 is provided between the lower edge of the sealing member 16 and the lower panel 10. This is to produce an airtight seal between the upper and lower panels 10 and 12, respectively. This type of seal is provided on two sides of the panel structure and in one particular embodiment cut from a wooden board.

The other sides of the two panels 10 and 12 are sealed by a sealing member 24 which has a planar bottom surface 26 and a half round upper surface 28 so that the upper surface can nest within one of the corrugations of the upper panel 12. A double backed adhesive strip 30 is positioned between the sealing member 24 and the upper panel 30. Any suitable adhesive strip may be applied between the edges of the lower panel 10 and the sides of the sealing member 24 producing a seal therebetween.

Figure 2:
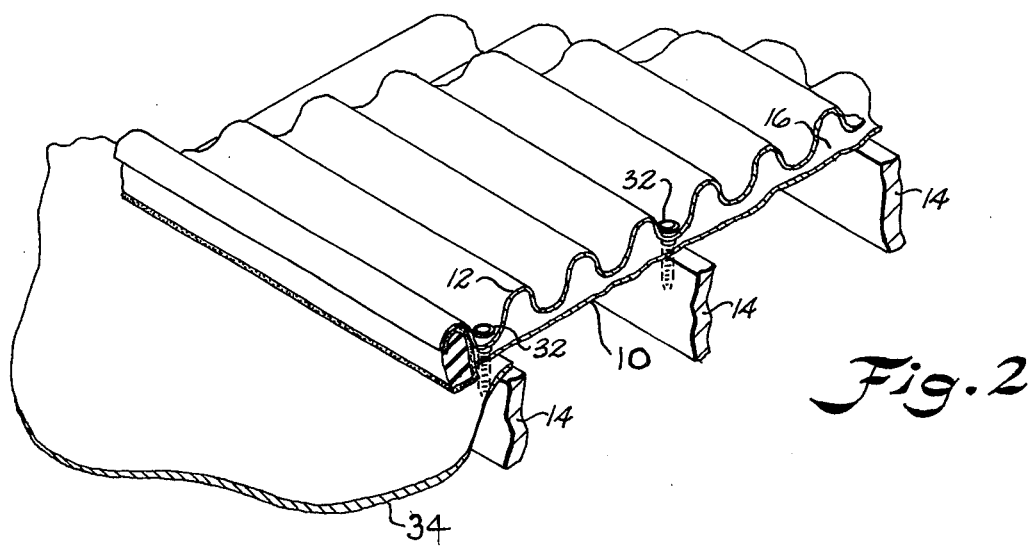
FIG. 2 is a perspective view illustrating the panel of FIG. 1 mounted on the truss of a building.

While the panel structure in FIGS. 1 and 2 are shown being mounted directly to the truss 14 of a building without any framing thereunder, it is to be understood that if the panels are assembled offsite then the panel members 10 and 12 and the strips 16 and 24 would be mounted directly to a rectangular frame so that such could be readily transported without costly damages to seals between the sealing members 24 and 16 and the panels 10 and 12. When mounting the panel structure to the truss or rafters 14 lag bolts 42 extend through the panel into the truss. Sealing washers should be placed on the lag bolts so as not to interfere with the seals between the upper and lower panels 10 and 12. Any other suitable means could be utilized for securing the panel structure to the truss 14. When the panel, is secured to a rectangular frame then the frame would be nailed directly to the roof structure.

Figure 3:
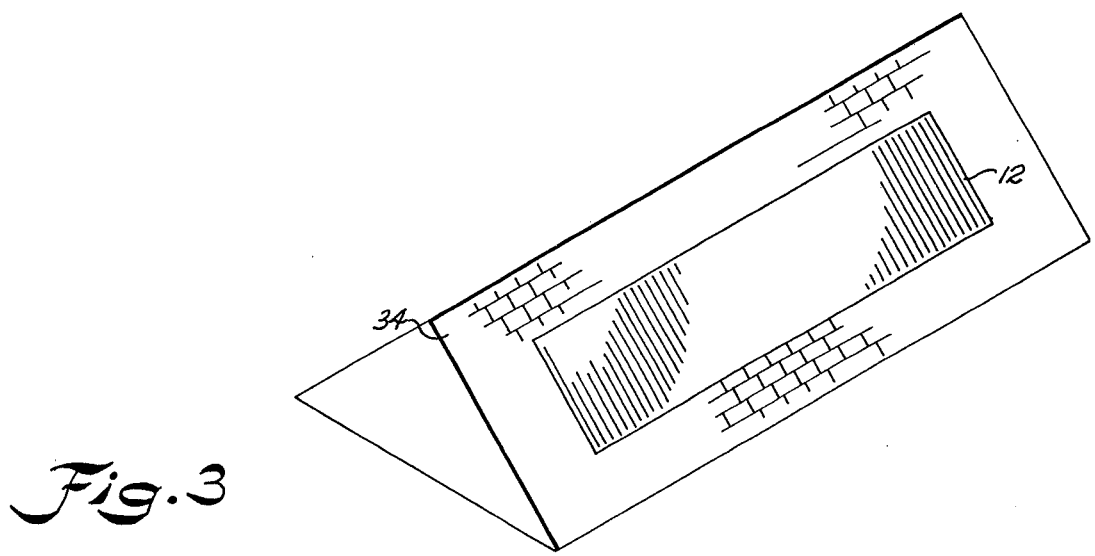
FIG. 3 is a perspective view illustrating the panel constructed in accordance with the present invention mounted in the roof of a house.

As illustrated in FIG. 3, the corrugations of the upper panel 12 extend in the direction of the slope of the roof 34 of the building. This is to permit snow and water to run readily thereof and to aid in maintaining the panels clean. By using a pair of panels such minimizes condensation from dripping into the attic below the roof 34. Also, since the panels 10 and 12 are constructed of translucent fiberglass panels such aid in minimizing the heat loss from the panels since air currents which would normally flow between the panels as they heat up are interrupted by the corrugations. However, this would not be a problem if a vacuum were placed between the panels. Similar convection air currents circulating within the attic set up a turbulence therein which minimizes heat loss back through the panel.

While a preferred embodiment of the invention has been described using specific terms, such description is for illustrative purposes only, and it is to be understood that changes and variations may be made without departing from the spirit or scope of the following claims.

What is claimed is:

1. A panel structure for being mounted on the roof of a building for permitting solar energy to pass therethrough into said building, said structure comprising:
   a. a first translucent panel having sinusoidal corrugations running continuously across said panel in a first direction;
   b. a second translucent panel having sinusoidal corrugations running continuously across said second panel substantially perpendicular to said first direction, said second panel being positioned on top of said first translucent panel;
   c. means for securing said panels together;
   d. first sealing members interposed between said first and said second panel, upper surfaces of said sealing members being complementary in shape with said corrugations for mating with said panel and producing a seal between said panels along two edges thereof;
   e. second sealing members sealing the other two edges of said panels thus producing a structurally strong and lightweight panel that can be readily mounted on a roof of a building for permitting energy from the sun to pass therethrough.

2. The panel as set forth in claim 1 wherein bottom surfaces of said first sealing members are positioned on top of said first translucent panel.

3. The panel as set forth in claim 2 wherein an adhesive strip is interposed between said upper and bottom surfaces of first sealing member and said translucent panels.

* * * * *